(12) United States Patent
Pyron

(10) Patent No.: US 7,902,466 B2
(45) Date of Patent: Mar. 8, 2011

(54) SELF-CENTERING FASTENER WITH MATING SEAL FLANGE

(75) Inventor: Roger Pyron, Arlington, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 245 days.

(21) Appl. No.: 12/355,204

(22) Filed: Jan. 16, 2009

(65) Prior Publication Data

US 2009/0194310 A1 Aug. 6, 2009

Related U.S. Application Data

(60) Provisional application No. 61/025,009, filed on Jan. 31, 2008.

(51) Int. Cl.
*H02G 3/04* (2006.01)

(52) U.S. Cl. ............ 174/481; 174/50; 174/480; 174/58; 248/300; 439/207

(58) Field of Classification Search .................... 174/50, 174/53, 57, 58, 66, 67, 480, 481; 220/3.2, 220/3.9, 4.02, 241, 242; 439/535, 207, 582; 248/906, 300; 52/220.1
See application file for complete search history.

(56) References Cited

U.S. PATENT DOCUMENTS

| | | | |
|---|---|---|---|
| 2,639,832 A | 5/1953 | Bergstrom | |
| 2,771,262 A | 11/1956 | Laystrom | |
| 3,272,952 A | 9/1966 | McKeon | |
| 4,020,971 A | 5/1977 | Ostbo | |
| 4,176,437 A | 12/1979 | Scholz et al. | |
| 4,232,496 A | 11/1980 | Warkentin | |
| 4,896,784 A * | 1/1990 | Heath | 220/3.2 |
| 4,993,724 A | 2/1991 | Hauff | |
| 5,173,026 A | 12/1992 | Cordola et al. | |
| 5,213,341 A | 5/1993 | Griffiths | |
| 5,360,130 A * | 11/1994 | Lehmann et al. | 220/3.8 |
| 5,593,321 A | 1/1997 | Hotea | |
| 5,621,189 A * | 4/1997 | Dodds | 174/50 |
| 6,053,682 A | 4/2000 | Krauter et al. | |
| 6,805,207 B2 | 10/2004 | Hagan et al. | |
| 7,427,714 B1 * | 9/2008 | Lammens et al. | 174/66 |

* cited by examiner

*Primary Examiner* — Dhiru R Patel
(74) *Attorney, Agent, or Firm* — Hoffmann & Baron, LLP

(57) ABSTRACT

An aspect of the present invention provides a conduit body assembly. The conduit body assembly has a conduit body with a closed lower end and a side wall surrounding the lower end. The side wall includes a planar perimetrical rim which defines an open upper end. Also, the conduit body assembly has a cover to enclose the open upper end. A deformable flexible flange extends from the at least one cover hole for engagement with a conical portion of a fastener in order to maintain alignment with and effect a seal between the cover and the fastener.

14 Claims, 4 Drawing Sheets

SELF-CENTERING FASTENER WITH MATING SEAL FLANGE

CROSS-REFERENCE TO RELATED APPLICATIONS

This application claims priority to U.S. Provisional Patent Application No. 61/025,009 filed on Jan. 31, 2008, the contents of which are incorporated herein by reference in entirety

FIELD OF THE INVENTION

The present invention relates generally to a conduit body assembly containing electrical wires. More particularly, the present invention relates to a self-centering fastener of a conduit body assembly which provides an effective seal with a mating flange on a cover.

BACKGROUND OF THE INVENTION

In various applications, when it is necessary to protect an object, it is desirable to surround an object with an enclosure. Though adequate security and protection of the object from the elements, dirt, or people may be desirable, at the same time, the enclosure must allow authorized use and access to the object enclosed therein. Therefore, it is often advantageous to include a covered opening. However, the problem resides in creating an adequate seal between the cover and the enclosure to secure the object therein from contaminates, moisture, dirt, and dust.

For example, electrical conduit systems aid in providing a protected supply of electrical power to homes, commercial buildings, and the like. These conduit systems often include long runs of rigid electrical conduit with frequent changes in direction. Conduit body assemblies are often installed in the conduit systems at various locations to provide access to the wires and to provide required change in direction in the conduit system.

With reference to FIG. 1, a conduit body assembly 2 typically includes a conduit body 4 configured to allow the passage of the electrical wires therethrough. The conduit body 4 is accessible through an opening 6, while a cover 8 may be placed over the opening of the conduit body to create a protective enclosure for electrical wires. As the conduit bodies are typically formed of metal, there can be irregularities such that the matching flat surfaces of the cover and the body provide little protection against the ingress of fluids, dust and other contaminants. Even when the cover or body are overmolded to effect a seal therebetween, the fasteners and fastener holes in the cover and conduit body can permit the ingress of fluids, dust, and other contaminants. Moreover, the mating and fastener surfaces may either be warped, scored or non-flat or possess flash from the manufacturing process leaving gaps when the cover is placed on the conduit body.

While certain conduit body assemblies and covers may include a coating therearound to aid in sealing the conduit assembly, the fastener-to-cover seal is still vulnerable to moisture, dirt, and contaminants. Also, as covers and/or fasteners wear over time, they are often replaced. The fastener-to-cover seal may vary with each replacement that is made, further contributing to the probability of an ineffective seal.

It is, therefore, desirable to provide a fastener and a cover which cooperate in a conduit body assembly to create and maintain an effective seal. Further, it is desirable that the fasteners and covers may be replaceable, yet still capable of providing the same effective seal. Similarly, it is desirable to apply the fastener and cover configuration to a general body assembly configuration, in which the body may provide and maintain a secure and effective seal to enclose an object. As such, it may be appreciated that the fastener and cover configuration may be applied to a variety of fields and applications.

SUMMARY OF THE INVENTION

An aspect of the present invention provides a conduit body assembly. The conduit body assembly has a conduit body. The conduit body has a closed lower end and a side wall surrounding the lower end. The side wall includes a planar perimetrical rim which defines an open upper end. Also, the conduit body assembly has a cover which is positionable over the perimetrical rim of the side wall to enclose the open upper end. The cover has at least one cover hole proximal to at least one conduit body hole. The conduit body assembly further has at least one fastener. The fastener fastens the conduit body and the cover together. The fastener has a portion configured to fit into the cover hole. A deformable flexible flange extends from the at least one cover hole. The flexible flange is positioned for engagement with the portion of the fastener in order to maintain alignment with and effect a seal between the cover and the fastener.

Another aspect of the present invention provides a body assembly. The body assembly has a body defining an enclosure area. The body has an open end to provide access to the enclosure area. The body assembly also has a cover positionable over the open end for enclosing the open end. The cover has at least one cover aperture proximal to at least one body aperture. At least one fastener fastens the body and the cover. The fastener has a portion configured to fit into the cover aperture. Also, the body assembly has a deformable flexible flange extending from the at least one cover aperture. The flexible flange is positioned for engagement with the portion of the fastener in order to maintain alignment with and effecting a seal between the cover and the fastener.

In preferred embodiments, the flexible flange may be formed of a plastic material such as polyvinyl chloride (PVC).

These and other features of the invention will be better understood through a study of the following descriptive and accompanying drawings.

DETAILED DESCRIPTION OF THE INVENTION

The present invention provides a conduit body assembly for use in protecting wiring and electrical components in, for example, an electrical system. The conduit body assembly of the present invention provides a self-centering fastener and/or a replaceable cover with a seal flange. The fasteners cooperate with the cover to maintain a sealed engagement with a conduit body thereof.

Also, the present invention provides a body assembly for use in protecting components in, for example, a system. The body assembly of the present invention provides a self-centering fastener and/or a replaceable cover with a seal flange. The fasteners cooperate with the cover to maintain a sealed engagement with a body thereof.

Figure 1:
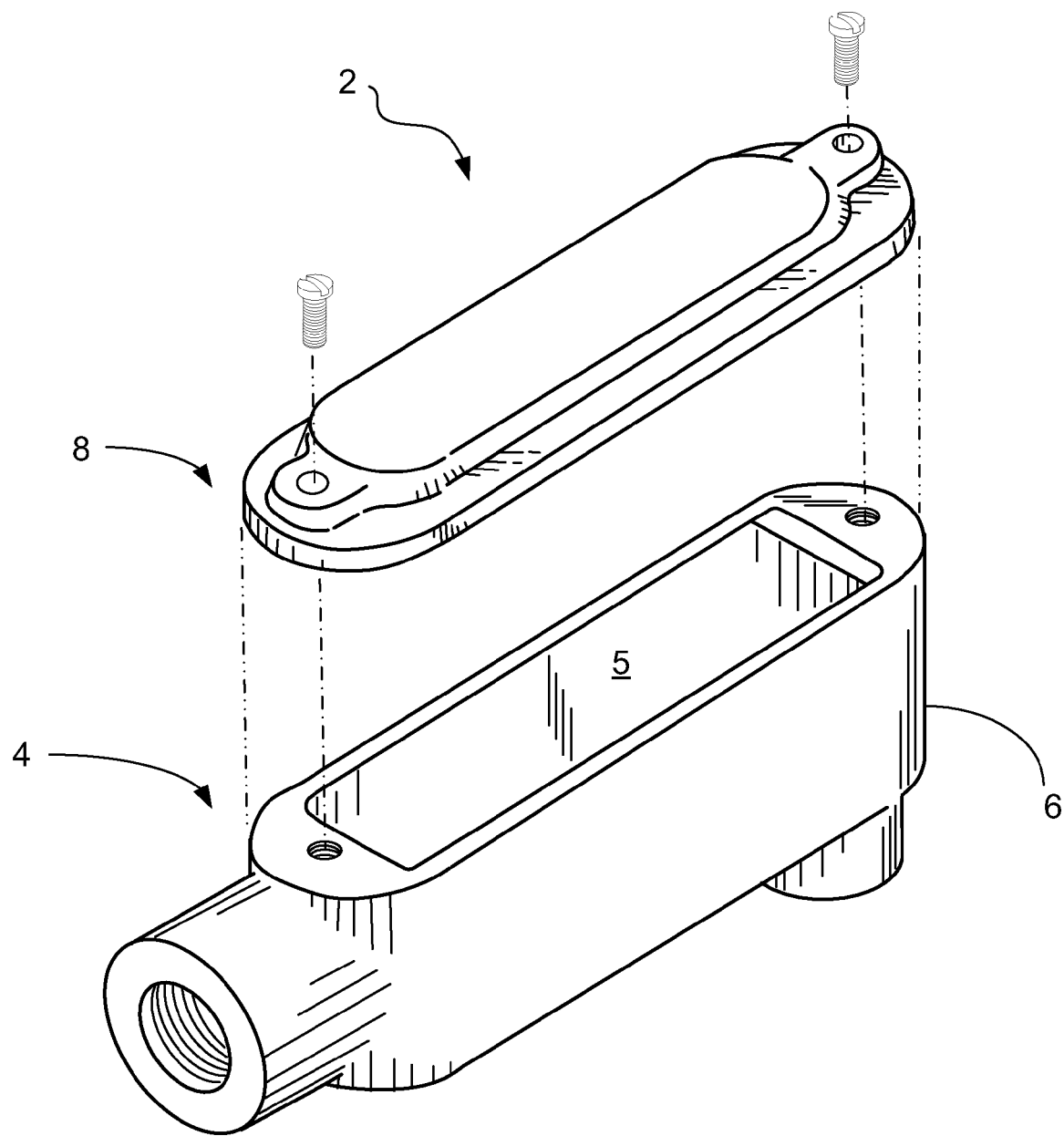
FIG. 1 is a perspective view of the conduit body assembly of the prior art.
Figure 2A:
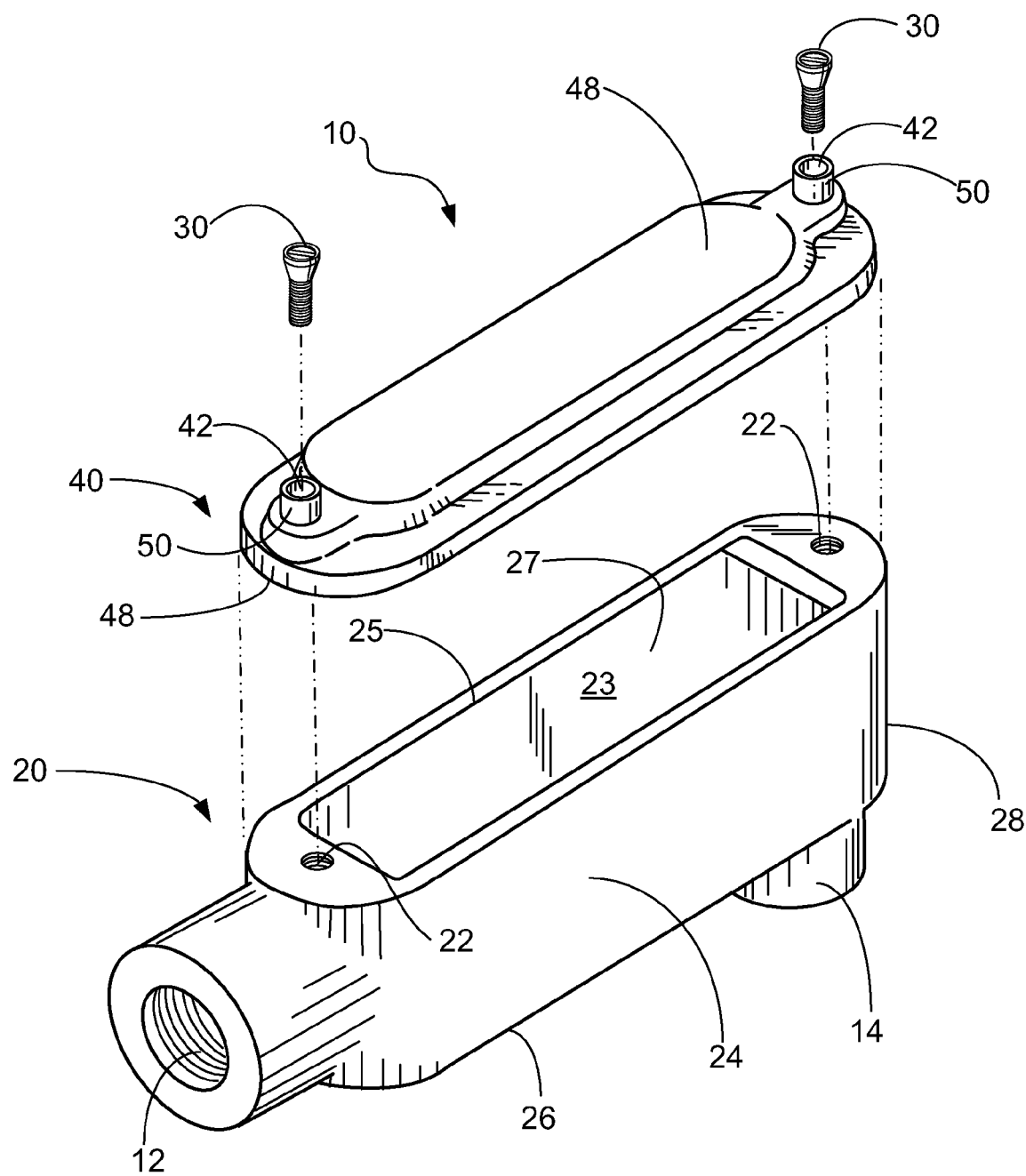
FIG. 2A is a perspective view of the conduit body assembly of the present invention.
Figure 2B:
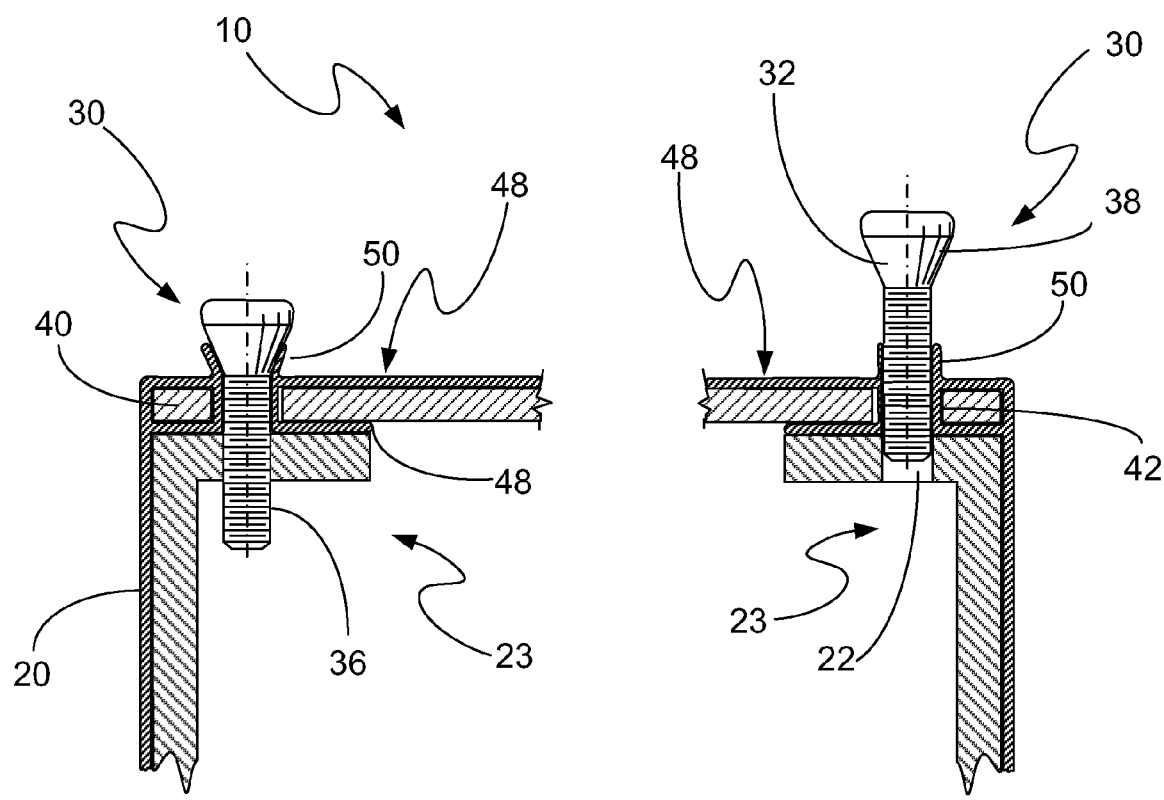
FIG. 2B is a schematic representation of the body assembly, split to show comparative configurations of the flexible flange with respect to the present invention.

With reference to FIGS. 2A and 2B, conduit body assembly 10 includes a conduit body 20 having a closed lower end 26, a side wall 24 surrounding the lower end 26, the side wall 24 including a planar perimetrical rim 25 defining an open upper end 27, which cooperate to create a conduit body interior 23. The conduit body assembly 10 also has two hubs (12, 14) which communicate with the interior 23 of the conduit body 20, and allow for ingress and egress of electrical wires. The conduit body assembly 10 typically cooperates with a cover 40 and fasteners to enclose the interior 23 from contaminates. Also, the conduit body assembly 10 has an overmolded portion on the body 20 and the cover 40 in order to effectuate a tight seal between the cover 40 and the conduit body 20. Fasteners 30 screw into cover holes 42 to secure the cover 40 to the upper end 27 of the body 20. To effectuate a seal between the body 20 and the cover 40, the body 20, the cover 40, or both may be covered with an overmolding (28, 48) to effectuate a seal therebetween.

Both covers 40 and fasteners 30 typically have blunt mating points. Blunt mating points require high precision fabrication and molding if a good seal is to be created and maintained. If there are any imperfections in either of the mating components, there will be a leak path. In addition, the cover 40 and enclosure components must be fabricated with tolerances which require the fasteners 30 to fit loosely to ensure assembly. These loose fasteners 30 require close attention when assembling to ensure full perimeter surface contact to achieve proper seal. If a proper seal is not achieved, then leaking, contamination, and faulty protection results.

FIG. 2B shows a schematic representation of a cover split to show comparative configurations of the present invention in a sealed and unsealed position. The present invention provides a conduit body assembly 10 that employs a flexible flange 50 and a fastener 30 with overmolding (48, 38, respectively). These two components are designed such that when mated, they will self correct alignment issues resulting from the cover/enclosure fabrication process. Also, these two components create a full perimeter seal as a result of an interference fit.

One or more components may be overmolded with various materials, including, for example, polyvinyl chloride. The overmolding extends onto the conduit body 20 and surrounds the conduit body holes 22 such that an environmental seal is effected upon fastening engagement of fasteners 30 with the conduit body holes 22.

The fasteners 30 are configured to correspond to the cover holes 42 and the conduit body holes 22 in order to effectuate a secure fastening to create a seal therebetween. The fasteners 30 have a conical portion 32 which is overmolded 38. The conical portion 32 is configured to abut against or fit into at least a portion of the cover holes 42 and effect a seal with the flexible flange 50. The overmolding 38 may be, for example, polyvinyl chloride. The overmolding sealing coating 38 preferably extends down to and/or overlaps threaded portion 36 of the fasteners 30. The fasteners 30 may have an overmolded 38 hexagonal head so that the angled heads of the fasteners may be gripped and spun with a tool, even in the event that the overmolding 38 detaches from the hex-head. Further, while overmolding 38 is described above as being conical, a more bulbous, teardrop, spherical or another shape will suffice so long as there can be a seal between fastener 30 and flange 50.

The cover sealing member 48 is configured to form the deformable flexible flanges 50. The deformable flexible flange 50 may be integrally formed with the overmolding or sealing member 48 of the cover 40. The shape of the flexible flange 50 may similarly be achieved through the use of a lip or cylindrical collar. For example, the flexible flange 50 may be a monothyically molded elastomeric flange. The deformable flexible flanges 50 extend upward from the cover 40 and preferably in a slight outward orientation from the cover holes 42.

The deformable flexible flanges 50 are positioned for engagement with the conical portion 32 of the fasteners 30. The flexible flange 50 appears as the upstanding collar or lip when the fastener 30 is in position aligning the cover hole 42 with the body hole 22. The flexible flange 50 appears as the deformed collar or lip, which deforms around or about at least a portion of the fastener 30 when the fastener 30 is tightened, creating a seal between the fastener 30, the flexible flange 50, and the cover 40.

As the fasteners 30 are tightened into place through the cover holes 42 and the conduit body holes 22, the deformable flexible flanges 50 deform consequentially to surround the conical portion of the fasteners 30. In such a manner, as the fastener 30 is tightened, the conical portion 32 of the fastener forces the flexible flange 50 to deform outward and away from its initial position. Once the fastener 30 is tightened, the flexible flange forms a tight, waterproof and contaminant proof seal. The pliable, self-adjusting confirming nature of the fastener 30 and flexible flange 50 helps assure sealing even when the cover 40 or cover hole(s) 42 may be non-flat, warped or have excess flash thereover. As such, the conduit body assembly 10 has an environmental seal which prevents the ingress of moisture, dirt, dust, and other non-desirable contaminants. As such, the present invention does not need a separate gasket or washer to seal the fastener 30 against the cover 40. Thus, the present invention saves both in time and cost over the long run of constructing and maintaining the conduit body assembly 10.

Optionally, the fastener 30 may include a fastener flange (not shown). The fastener flange may have a mirrored configuration with the flexible flange 50 of the cover 40. As such, when the fastener 30 is tightened, the fastener flange may be configured to wrap around an outside portion of the flexible flange 50. Thus, not only will the conical portion 32 of the fastener 30 be in an effective seal with the flexible flange 50, but so too will the fastener flange be in an effective seal with the outer portion of the flexible flange 50.

Figure 3:
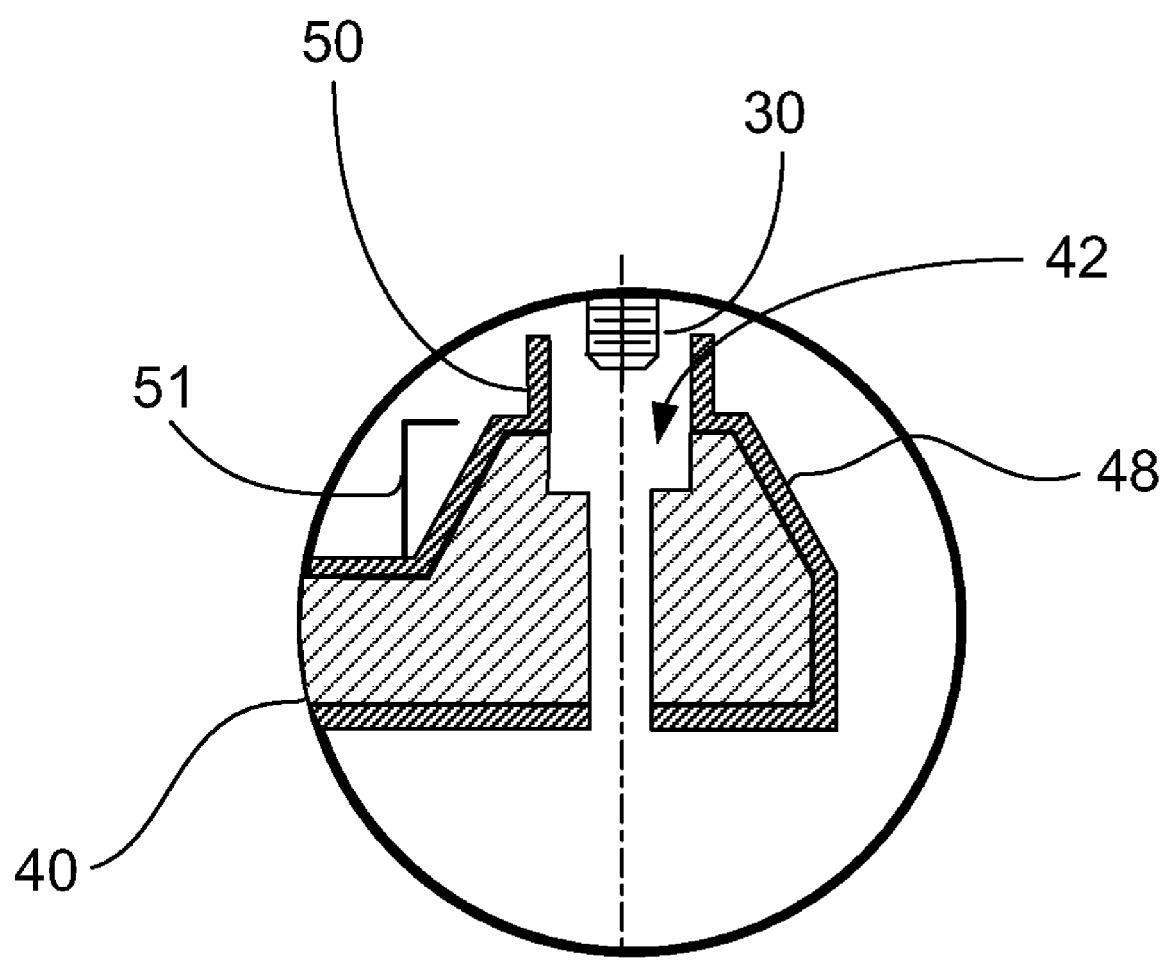
FIG. 3 is an enlarged view of one embodiment of the engagement between the fastener and the cover of the conduit body assembly of the present invention.

In another embodiment, the flexible flange 50 includes a raised boss-type portion 51 of the cover 40 with the flexible overmolded portion 48, as depicted in FIG. 3. Thus, once the fastener 30 is tightened into the cover hole 42, the conical portion 32 of the fastener 30 will form a tight seal alignment with the boss portion 51 of the cover 40, and the overmolded covering 48 will effectuate a tight seal between the fastener 30 and the cover 40.

A number of embodiments of the invention have been described. Nevertheless, it will be understood that various modifications may be made without departing from the spirit and scope of the invention. For example, the body assembly 10 of the present invention may be configured as the conduit body assembly 10 with one or more of the elements or features previously discussed and described. Also, the features and elements described above may be modified in various than described above, where appropriate. Accordingly, alternative embodiments are within the scope of the following claims.

What is claimed is:

1. A conduit body assembly, comprising:
a conduit body having a lower end, a side wall surrounding said lower end, said side wall including a planar perimetrical rim defining an open upper end;
a cover positionable over said perimetrical rim of said side wall for enclosing said open upper end, said cover having at least one cover hole proximal to at least one conduit body hole;
at least one fastener, for fastening said conduit body and said cover, said fastener having a portion configured to fit into said cover hole; and
a deformable flexible flange extending from said at least one cover hole, said flexible flange positioned for engagement with said portion of said fastener, for maintaining alignment with and effecting a seal between said cover and said fastener.

2. The conduit body assembly of claim 1, further comprising a cover sealing member formed on said cover for engagement against said perimetrical rim of said side wall for effecting a seal therebetween, said flexible flange being integrally formed of said sealing member.

3. The conduit body assembly of claim 2, wherein said cover sealing member is overmolded onto said cover.

4. The conduit body of claim 2, wherein said sealing member is formed of polyvinyl chloride.

5. The conduit body assembly of claim 1, wherein said conduit body includes a body sealing member around said at least one conduit body hole.

6. The conduit body assembly of claim 5, wherein said body sealing member is overmolded onto said body.

7. The conduit body assembly of claim 1, wherein said fastener includes an overmolded sealing coating on a conical portion for sealing engagement with said flexible flange.

8. A body assembly, comprising:
a body defining an enclosure, said body having an open end, said body having at least one hub in communication with a body interior;
a cover positionable over said open end for enclosing said open end, said cover having at least one cover aperture proximal to at least one body hole;
at least one fastener, for fastening said body and cover, said fastener having a portion configured to fit into said cover aperture; and
a deformable flexible flange extending from said at least one cover aperture, said flexible flange positioned for engagement with said portion of said fastener, for maintaining alignment with and effecting a seal between said cover and said fastener.

9. The body assembly of claim 8, further comprising a cover sealing member formed on said cover for engagement against said body proximal to said open end for effecting a seal therebetween, said flexible flange being integrally formed of said sealing member.

10. The body assembly of claim 9, wherein said cover sealing member is overmolded onto said cover.

11. The body assembly of claim 9, wherein said sealing member is formed of polyvinyl chloride.

12. The body assembly of claim 8, wherein said body includes a body sealing member around said at least one body hole.

13. The body assembly of claim 12, wherein said body sealing member is overmolded onto said body.

14. The body assembly of claim 8, wherein said fastener includes an overmolded sealing coating on a conical portion for sealing engagement with said flexible flange.

* * * * *